United States Patent [19]

Tanaka

[11] Patent Number: 5,656,816

[45] Date of Patent: Aug. 12, 1997

[54] INFRARED DETECTOR AND DRIVE METHOD THEREFOR

[75] Inventor: Akio Tanaka, Tokyo, Japan

[73] Assignee: NEC Corporation, Tokyo, Japan

[21] Appl. No.: 586,404

[22] Filed: Jan. 16, 1996

[30] Foreign Application Priority Data

Jan. 20, 1995 [JP] Japan ................................. 7-026246

[51] Int. Cl.$^6$ ................................................. G01J 5/20
[52] U.S. Cl. .................. 250/339.01; 250/332; 250/338.1
[58] Field of Search .......................... 250/339.01, 338.1, 250/339.02, 332, 338.4, 352

[56] References Cited

U.S. PATENT DOCUMENTS

| 5,231,532 | 7/1993 | Magel et al. ........................... | 359/29 |
| 5,298,748 | 3/1994 | Kenny et al. ......................... | 250/338.1 |

FOREIGN PATENT DOCUMENTS 2-196929  8/1990  Japan .

OTHER PUBLICATIONS by C. Hilsum, "Infrared Absorption of Thin Metal Films", *Journal of the Optical Society of America*, vol. 44, No. 3, Mar. 1954, pp. 188–191.

Primary Examiner—Carolyn E. Fields
Attorney, Agent, or Firm—Young & Thompson

[57] ABSTRACT

A detector comprises an infrared reflection layer and a diaphragm member, the infrared reflection layer and the diaphragm member facing each other, with a space intervening therebetween, and the diaphragm member comprises an infrared absorbable layer. A signal varies a distance between the diaphragm member and the infrared reflection layer, and thus a band of an absorbed wavelength is varied. The distance is varied by a voltage applied between a first conductive layer disposed at the infrared reflection layer side and a second conductive layer disposed at the diaphragm side. In driving the detector, a surface of the diaphragm is contacted with a surface of the structure temporarily by altering a voltage applied therebetween.

11 Claims, 8 Drawing Sheets

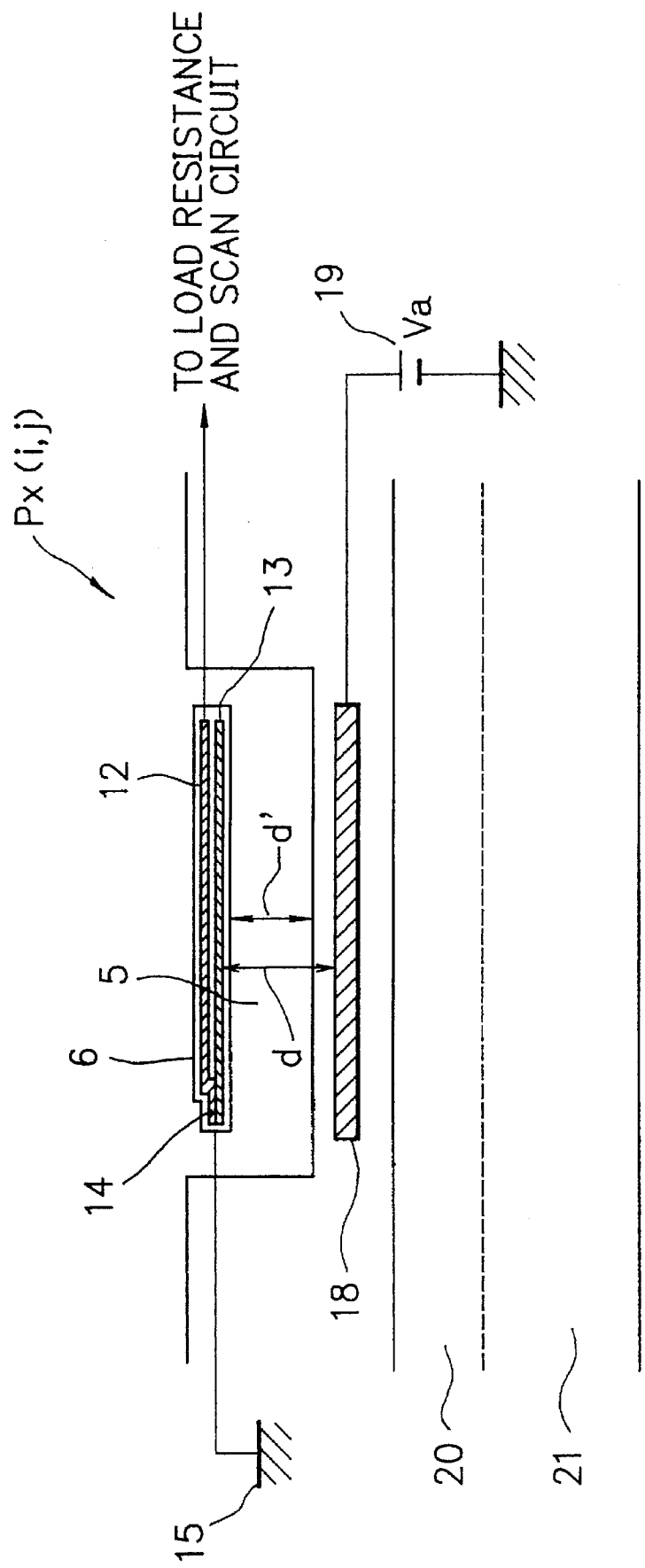

INFRARED DETECTOR AND DRIVE METHOD THEREFOR

BACKGROUND OF THE INVENTION

The present invention relates to an infrared detector and a drive method therefor, and in particular, to an infrared detector with a wide range of applications such as to a crime prevention, watching, guidance, medicine and industrial instrumentation, and to a drive method therefor. More specifically, the invention relates to a thermal infrared detector having a thermoelectrical conversion element for converting thermal energy into an electrical signal, and to a drive method therefor.

Description of the Related Art

Recent years have observed an increased demand for an infrared detector adaptive to measure a temperature of an object in a non-contact manner, with an increased need for development of an inexpensive high-performance thermal infrared detector.

The state of art will be described with reference to FIGS. 1A and 1B.

FIGS. 1A and 1B show a sectional view and a plan view of a conventional thermal infrared detector, respectively.

As shown in the figures, the conventional thermal infrared detector includes a semiconductor substrate 29, a scan circuit 30 formed thereon, and a cavity 31 formed above the circuit 30, and further has formed over the cavity 31 a diaphragm or beam with a thermoelectrical conversion element 32 and an infrared absorption layer 34 thereabove.

The thermoelectrical conversion element 32 comprises a titanium bolometer made of the titanium, a material with a variable resistance depending on a temperature.

The diaphragm is constituted with three layers: the titanium bolometer 32, a silicon oxide film 33 and a titanium nitride film as an infrared absorption layer 34. As the silicon oxide film 33 set to a thickness of $\lambda/(4n)$ (n is a refractive index of the silicon oxide film, and $\lambda$ is a wavelength of an incident infrared ray), correspondent infrared rays reflected by the titanium bolometer 32 are absorbed into the titanium nitride 34.

This is due to an electromagnetic effect in which an electromagnetic wave of a wavelength $\lambda$ constitutes a standing wave resonating in the gap of $\lambda/(4n)$. The titanium bolometer 32 concurrently serves as a thermoelectrical conversion element and an infrared reflection film.

The diaphragm is formed over the cavity, with long legs to avoid a dissipation of thermal energy, so the absorbed infrared rays cause a temperature rise over an entirety of the diaphragm. This leads to a resistance variation of the titanium bolometer 32 in the diaphragm, which variation is externally output through a scan circuit as discussed, e.g. in "Infrared Absorption of Thin Metal Films" by C. Hilsum, JOURNAL OF THE OPTICAL SOCIETY OF AMERICA, VOL. 44, NO. 3, 1954, and Japanese Patent Application No. 6-189144.

The conventional infrared detector described uses a combination of a titanium nitride film, a silicon oxide film and a titanium bolometer (reflection film) as an infrared absorption layer.

In another conventional case, a vacuum is used instead of the silicon oxide film to form a gap of $\lambda/(4n)$, as disclosed e.g. in Japanese Patent Laid-Open Publication No. 2-196929.

In this case, an aluminum reflection film is provided under a cavity, and a titanium nitride as an infrared absorption layer is provided inside a diaphragm on the cavity. In the case of vacuum, a refractive index n thereof is approximately 1, so the cavity gap is set to $\lambda/4$.

Further, in this conventional case, a chopper is provided at a front side of an infrared detector, to periodically cut off incident infrared rays.

In general, the chopper is employed to temporarily cut off incident infrared rays for a calibration of an offset (drift) of an infrared detector, as the offset is variable for various reasons. For example, in a thermal infrared detector with a bolometer, a temperature variation of the detector itself may turn into a signal as it is, giving an adverse effect. When objects having a temperature difference of 1° C. are observed, a temperature variation of about 0.002° C. may well be caused at a diaphragm by incident infrared rays. Therefore, even if the temperature variation of the detector is very small, the resultant effect may be large.

A signal output from the infrared detector is typically subjected to several amplification stages and correction stages such as for removing a fixed pattern. There may also be large temperature drifts in circuits associated with such stages, giving eventual influences on the signal. Therefore, such influences are removed by a correction using as a reference a signal level obtained when incident infrared rays are cut off.

In the conventional infrared detectors, a wavelength for an optimum absorption depends on a gap distance. However, as an infrared absorption layer is fixed, a detection sensitivity may be lowered with a deviating variation in wavelength of incident infrared rays.

For example, when observing an object having a temperature of approximately 300° K., which is close to a room temperature, a wavelength with maximum power appears in a vicinity of 10 μm, while it shifts in a vicinity of 4 μm when a high temperature object of approximately 1000° K. is observed.

In this respect, a gap distance set to e.g. 10 μm/(4n) is optimal for absorbing a wavelength of 10 μm. However, for wavelengths deviated from 10 μm, an optimum absorption is unattainable.

Further, as a chopper periodically cutting off incident infrared rays is typically driven by a driver such as a motor, there are additional problems in size reduction and power consumption. However, without a chopper, an infrared detector is attended with another problem that a large temperature drift occurs.

The present invention has been achieved with such points in mind.

SUMMARY OF THE INVENTION

It therefore is an object of the present invention to provide an infrared detector and a drive method therefor which overcome the above described problems.

To achieve the object, a first genus of the present invention provides an infrared detector including an infrared reflection layer and a diaphragm member facing each other, with a space intervening therebetween, the diaphragm member having an infrared absorbable layer, wherein the diaphragm member is controllable of a distance thereof relative to the infrared reflection layer so that the distance between the diaphragm member and the infrared reflection layer is variable in dependence on a wavelength of an incident infrared ray.

According to a species of the first genus of the invention, the infrared detector has at a side thereof, where the infrared reflection layer is provided, a semiconductor substrate and a scan circuit in the semiconductor substrate.

According to another species of the first genus of the invention, the diaphragm member controllable of the distance relative to the infrared reflection layer comprises a bimetal structure composed of a pair of layers different of an internal stress characteristic from each other.

According to another species of the first genus of the invention, the infrared reflection layer comprises a tungsten silicide.

According to another species of the first genus of the invention, the diaphragm member controllable of the distance relative to the infrared reflection layer is controlled for a variation of the distance in dependence on the wavelength of the infrared ray, with a voltage applied between a first conductive layer disposed on a side of the infrared detector, where the infrared reflection layer is provided, and a second conductive layer disposed on another side thereof, where the diaphragm is provided.

Moreover, to achieve the object described, a second genus of the present invention provides a driving method for an infrared detector including an infrared reflection layer and a diaphragm member facing each other, with a space intervening therebetween, the diaphragm member having an infrared absorbable layer, wherein the distance between the diaphragm member and the infrared reflection layer is varied in dependence on a wavelength of an incident infrared ray.

Further, to achieve the object, a third genus of the present invention provides a driving method for an infrared detector including an infrared reflection layer and a diaphragm member facing each other, with a space intervening therebetween, the diaphragm member having an infrared absorbable layer, wherein a surface of the diaphragm member and a surface of a structure of the infrared reflection layer are temporarily brought into contact with each other.

Furthermore to achieve the object, a fourth genus of the present invention provides a driving method for an infrared detector including an infrared reflection layer and a diaphragm member facing each other, with a space intervening therebetween, the diaphragm member having an infrared absorbable layer, wherein the distance between the diaphragm member and the infrared reflection layer is varied in dependence on a wavelength of an incident infrared ray, and a surface of the diaphragm member and a surface of a structure of the infrared reflection layer are temporarily brought into contact with each other.

According to a species of any of the second to fourth genera of the invention, the distance between the diaphragm member and the infrared reflection layer is varied by varying a voltage applied between a first conductive layer disposed at a side of the infrared detector, where a (or the) structure of the infrared reflection layer is provided, and a second conductive layer disposed at another side thereof, where the diaphragm is provided.

Therefore, according to the present invention, in an infrared detector including an infrared reflection layer and a diaphragm member facing each other, with a space intervening therebetween, the diaphragm being implemented to absorb an infrared ray, a signal is employed to have varied a distance between the diaphragm and the infrared reflection layer, causing an absorbable wavelength band to vary, so that the infrared ray to be absorbed has a varied wavelength for an optimum absorption.

Further, according to the present invention, in an infrared detector including a structure and a diaphragm member facing each other, with a space intervening therebetween, a surface of the diaphragm is temporarily brought into contact with a surface of the structure to control a temperature rise of the diaphragm, so that a signal level then obtained can be used as a reference for a drift correction.

BRIEF DESCRIPTION OF THE DRAWINGS

The objects, features and advantages of the present invention will become more apparent from the consideration of the following detailed description, taken in conjunction with the accompanying drawings, in which:

FIG. 5 is a sectional view of the infrared detector of FIG. 4;

DESCRIPTION OF THE PREFERRED EMBODIMENTS

Figure 1A:
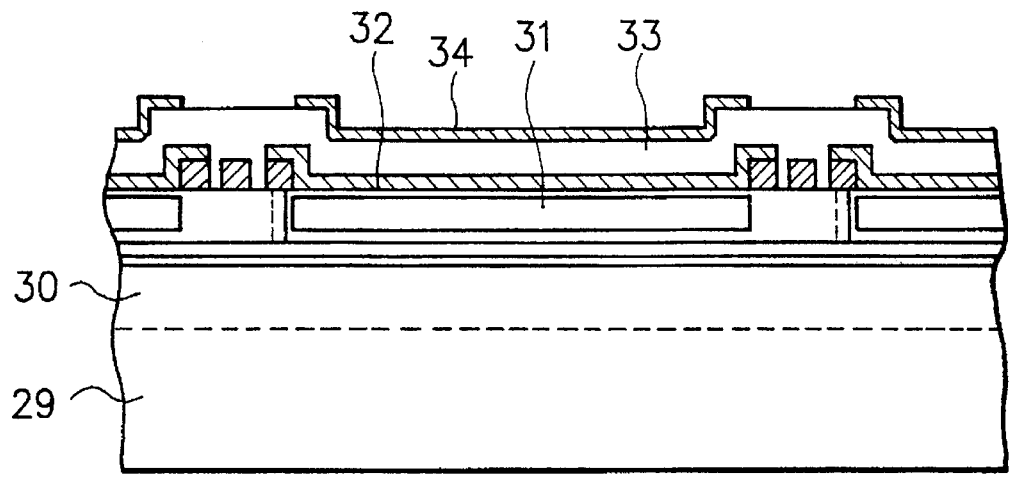
FIGS. 1A and 1B show a sectional view and a plan view of a conventional thermal infrared detector, respectively.
Figure 1B:
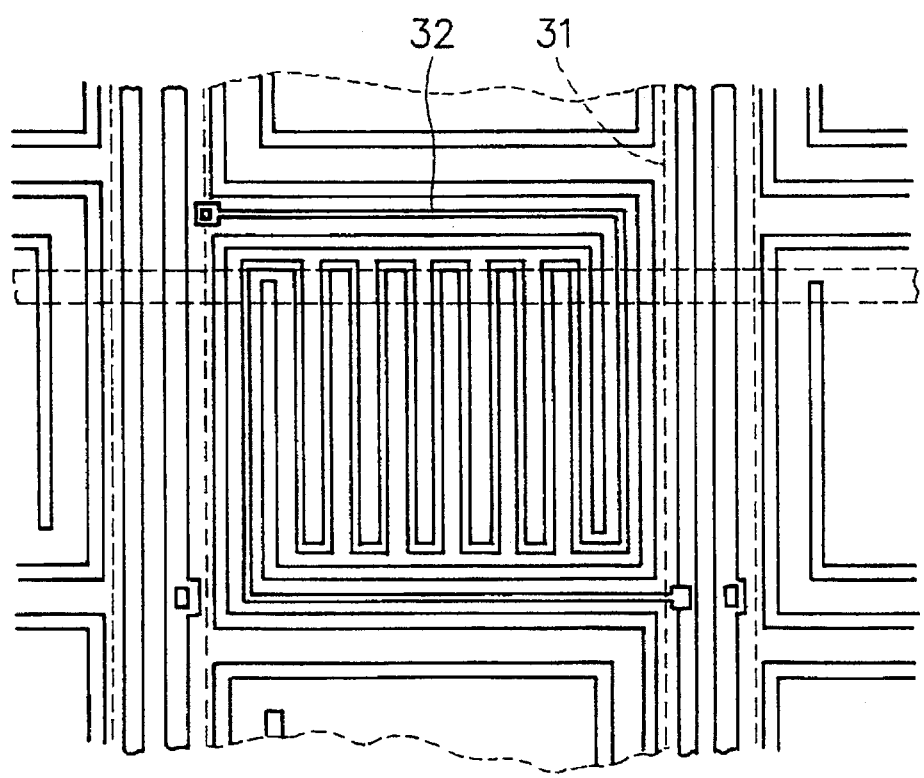

There will be detailed below the preferred embodiments of the present invention, with reference to FIGS. 2A, 2B, 3–5, 6A and 6B, and 7–8. Like members are designated by like reference characters.

Figure 2A:
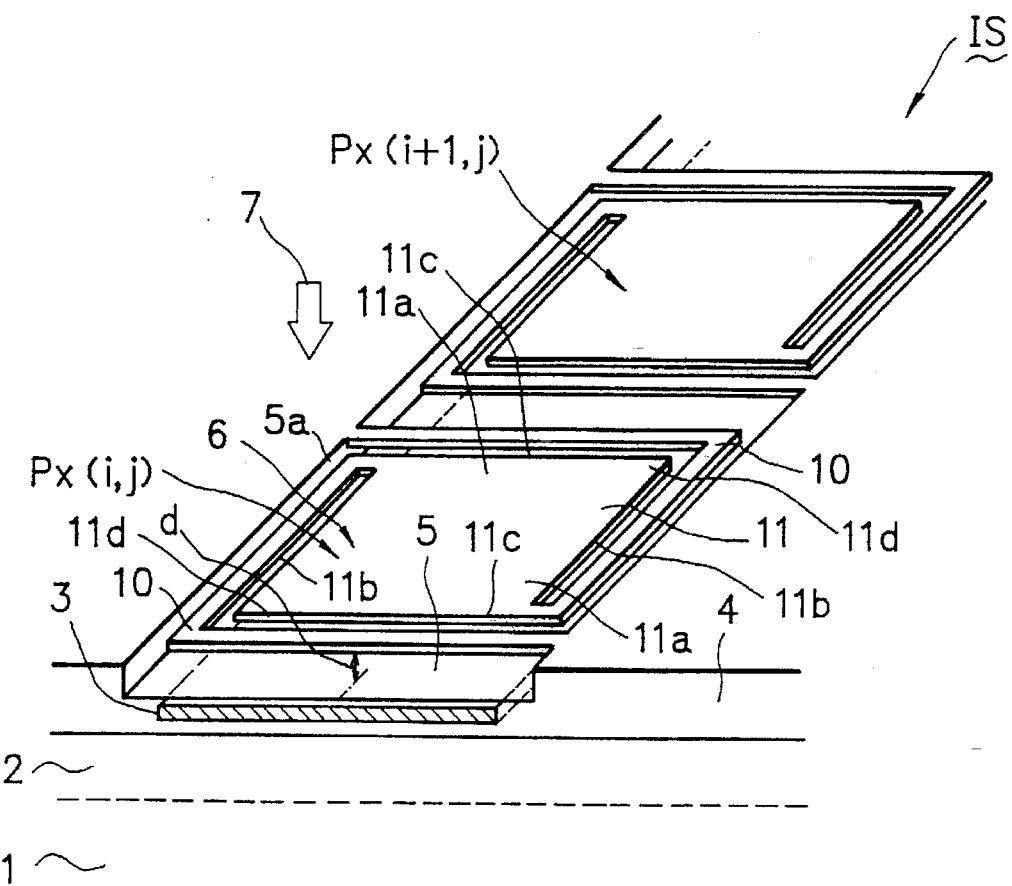
FIGS. 2A, 2B and 2C show a perspective view and sectional views of an infrared detector according to an embodiment of the invention, respectively.
Figure 2B:
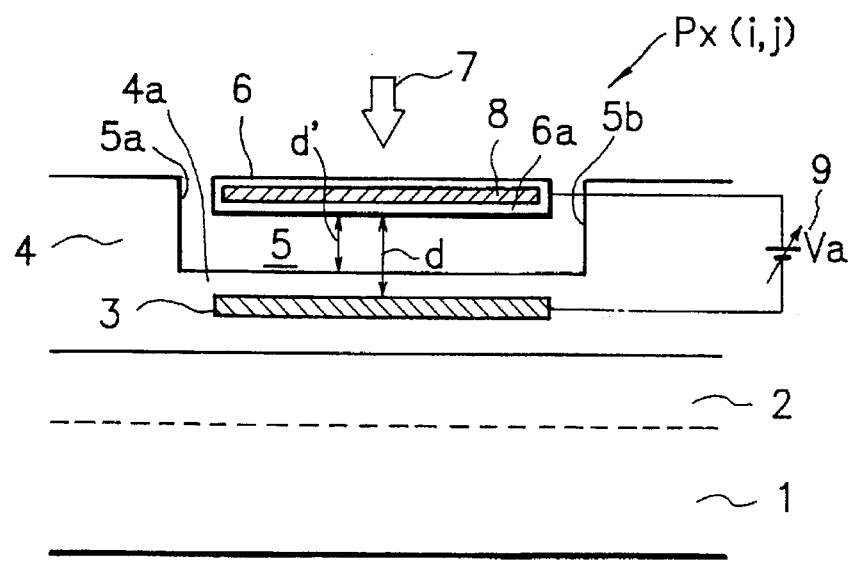

FIGS. 2A and 2B are a perspective view and a sectional view of an infrared detector according to an embodiment of the invention, respectively.

In FIG. 2A, designated at reference character IS is an infrared image sensor. The image sensor IS includes a matrix of infrared picture elements or pixels Px(i, j) each respectively constituted as the infrared detector according to the embodiment of the invention, where i is an arbitrary row number of the matrix and j is an arbitrary column number of the matrix.

As shown in FIGS. 2A and 2B, on an associated region of a semiconductor substrate 1 is formed an associated portion of a scan circuit 2 including a MOSFET (metal oxide semiconductor field effect transistor) or a bipolar transistor, with an infrared reflection layer 3 and an oxide film 4 formed thereabove, in this order, and above the infrared reflection layer 3 is formed a cavity 5, as well as a diaphragm 6 extending thereover. The diaphragm 6 includes an infrared absorption layer 8.

More specifically, the infrared detector Px(i,j) is formed as follows.

After a polycrystalline silicon is formed on a region to be processed to constitute the cavity 5, a layer 6 to be processed to constitute the diaphragm 6 is formed thereon covering an entire surface area. Then, the layer to constitute the diaphragm 6 is partially removed by an etching such that left portions constitute a pair of long legs 10. As a result, the polycrystalline silicon is exposed along etched narrow regions. Next, the polycrystalline silicon is removed by an etching using an alkaline solution such as a KOH or a hydrazine, to have the diaphragm 6 in the form of a floating structure in space, as shown in the perspective view of FIG. 2A.

The floating structure of the diaphragm 6 comprises a substantially square light-receiving flat part 11 resiliently supported by the legs 10, which are each composed of a substantially L-shaped strip extending from one corner 11a of the light-receiving part 11, that faces one side wall 5a (or 5b) of the cavity 5, along two sides 11b and 11c of the part 11, that constitute therebetween a neighboring corner 11d of the part 11, to an opposite side wall 5b (or 5a) of the cavity 5, where it is integrated with the oxide film 4.

Incident infrared rays 7 onto the diaphragm 6 from thereabove are partially absorbed by the diaphragm 6, before remaining rays reach the infrared reflection layer 3, where they are reflected in dependence on a reflectance of the layer 3.

A gap d' of the cavity 5 or more specifically a distance d between the layers 3 and 8 is set to $\lambda/(4n)$, where n is an apparent refractive index along the distance d and $\lambda$ is a wavelength of infrared rays to be best detected.

To this point, an actual refractive index is substantially a unity in the cavity 5 and may be near three in a silicon oxide layer 4a covering an upper face of the infrared refraction layer 3 and another silicon oxide layer 6a covering a lower face of the infrared absorption layer 8.

Therefore, the layers 4a and/or 6a may have their/its thickness(es) increased for a decrease in cavity gap d' to e.g. provide an increased rigidity to the floating structure of the diaphragm 6, or decreased for an increase in cavity gap d' to e.g. provide an increased resiliency to the floating structuer.

Between the layers 3 and 8, reflected infrared rays form standing waves to be electromagnetically effectively absorbed into the infrared absorption layer 8 in the diaphragm 6.

The infrared absorption layer 8 may comprise a thin titanium nitride layer of a thickness about several hundred Å (Angstroms). The infrared reflection layer 3 may comprise a conductive material high of infrared reflectance.

Both the infrared absorption layer 8 and the infrared reflection layer 3 are conductors, so that Coulomb forces act when a voltage Va is applied therebetween from a variable voltage source 9.

Each leg 10 of the diaphragm 6 is resilient (with a resiliency due e.g. to a bimetal structure, as will be discussed later), so that the cavity gap d' is variable in a reversible manner in dependence on the voltage Va, whereby the wavelength to be best absorbed or detected is like variable.

Figure 3:
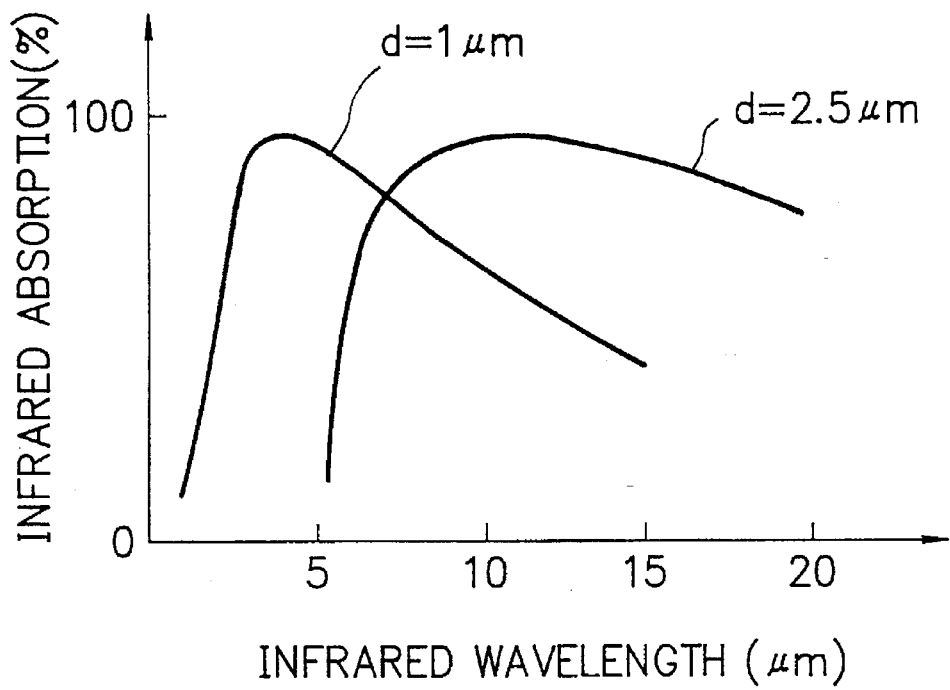
FIG. 3 is a graph showing an operation of the infrared detector of FIGS. 2A and 2B.

FIG. 3 is a graph showing a performance of the infrared detector Px(i,j). In the graph, horizontal and vertical axes indicate an infrared wavelength (μm) and an infrared absorption (%), respectively.

As shown in FIG. 3, in a case the infrared detector is designed for a distance d=2.5 μm to be set with an applied voltage Va=0 V, the infrared absorption has a peak at a wavelength in a vicinity of 10 μm, but becomes very small in a range of infrared wavelengths near 4 μm.

However, by changing the voltage Va so that Coulomb forces reduce the distance d to e.g. 1 μm, a high absorption is permitted even for infrared wavelengths in a vicinity of 4 μm.

The relationship between the applied voltage Va and the distance d or cavity gap d' depends on the resiliency of the legs 10 and an initial setting $d_0$ or $d_0'$ of the distance d or gap d' (i.e. a value of d or d' at Va=0), as well as on other associated design parameters.

In a preferable case in which the initial distance $d_0$=2.5 μm, the gap d' becomes substantially null with an applied voltage Va of about 20 V.

Figure 2C:
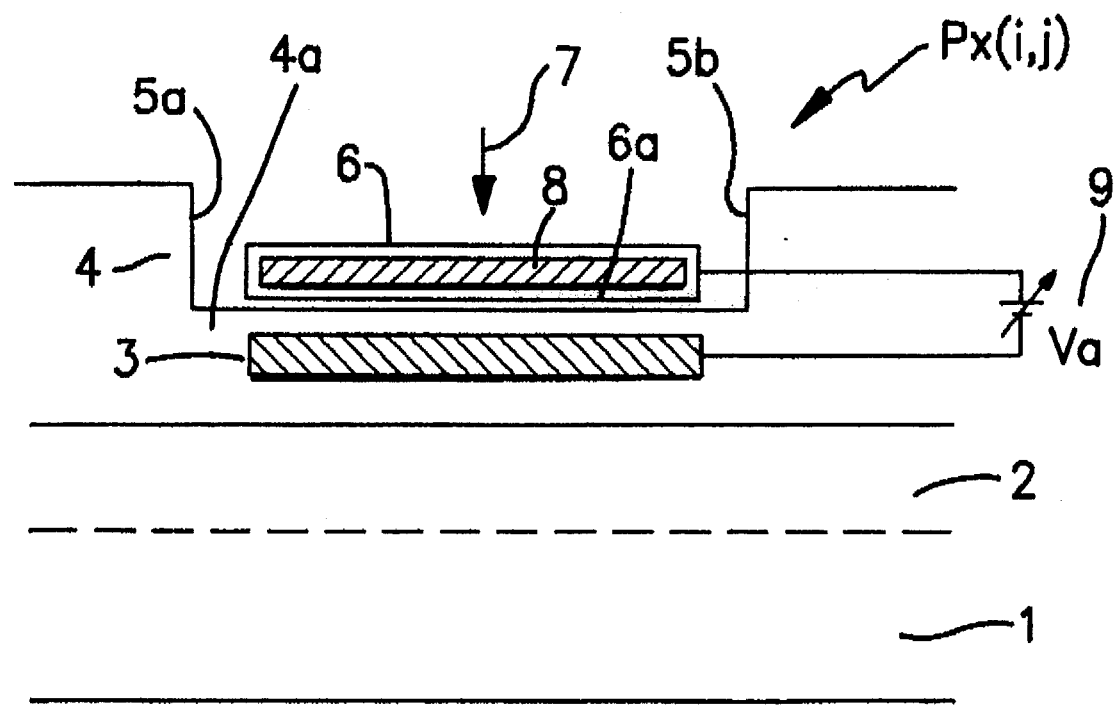

That is, by changing the voltage Va from 0 V to 20 V, the gap d' is effectively varied from 2.5 μm to 0 μm (contact, as shown in FIG. 2C), and the wavelength for an optimum absorption can be arbitrarily set under 10 μm.

With respect to the applied voltage Va, essential for such an effect is the absolute value. Polarity may be changed, with an identical effect.

In the present embodiment, for varying the distance d between the infrared reflection layer 3 and the infrared absorption layer 8, a voltage Va is applied between therebetween. However, as long as Coulomb forces are caused to act as necessary for a gap control between the diaphragm 6 and the substrate 1, other conductive layers may also be used.

Moreover, the present invention may employ any kinds of forces (Coulomb force inclusive), alone or in combination, so long as they act as necessary between the diaphragm 6 and the substrate 1.

Further, the infrared reflection layer needs to have a high infrared reflection. Although metals generally have high infrared reflections, the polycrystalline silicon used in the fabrication process may well be formed by a CVD at about 600° C. Therefore, any materials for the infrared reflection layer 3 should be selected with this point in mind.

In this concern, a typical semiconductor production line has a tungsten silicide as a conductive material to be formed before a polycrystalline silicon process. The tungsten silicide has a relatively high infrared reflection, and may preferably be employed as a material for the infrared reflection layer 3.

The detector Px(i,j) will be further described with reference to FIGS. 2A and 2B.

The diaphragm 6 has an increased temperature, as it absorbs infrared rays. However, if a dissipation of heat through the legs 10 is large, the temperature will not efficiently rise. Therefore, a thermal conductance of each leg 10 needs to be reduced. In order to reduce the conductance, a material with a small thermal conductivity may well be employed in combination with a reduced sectional area of each leg 10.

Although a silicon oxide film is a material having a very small thermal conductivity, a silicon oxide film of a single layer may be insufficient to provide a strength for a stable floating of the diaphragm 6 in space. Therefore, in that case, the sectional area of leg 10 may be enlarged, with an increased heat dissipation.

The silicon nitride film has a slightly larger thermal conductivity than the silicon oxide film, but is very hard. Further, the silicon oxide film generally has internal stresses in an extending direction while the silicon nitride film has internal stresses in a contracting direction.

In this respect, in a structure composed of a silicon oxide film as a lower layer and a silicon nitride film as an upper layer overlapping the lower layer, fixed at their one-ends, there is an increased tendency to produce floating forces due to the so-called bimetal effect, so that a sufficient strength can be effectively obtained even with a relatively small sectional area. Therefore, the legs 10 may well have such a bimetal structure.

Further, as described, each leg 10 is resilient. In an exemplary case in which each leg 10 has a width of about 2

μm and a structure constituted with a silicon oxide film of a 3000 Å thickness and a silicon nitride film of a 500 Å thickness, there may be provided a strength high enough to have float a light receiving part 11 of about 50 μm square. Even if the combination of the silicon oxide film and the silicon nitride film is substituted by a combination of other films, such an effect will be readily achieved so long as internal stresses are different.

The diaphragm member 6 has formed thereon a thermo-electrical conversion element for converting a temperature rise of the diaphragm 6 into an electrical signal. Such a layer may be constituted as a thermocouple, a bolometer or a pyrometer.

An infrared detector Px(i,j) according to another embodiment of the invention will be described with reference to FIGS. 4 and 5, in which a bolometer is formed upside an infrared absorption layer.

Figure 4:
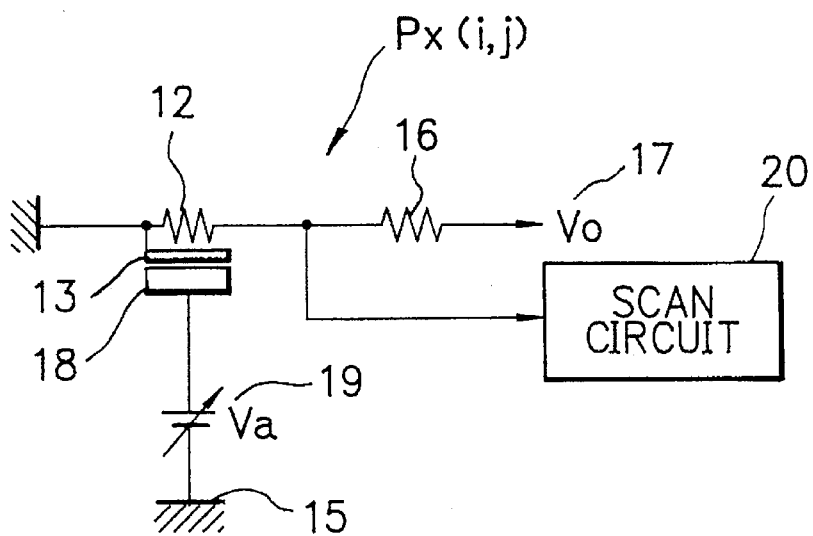
FIG. 4 is a circuit diagram of an infrared detector according to another embodiment of the invention.

FIGS. 4 and 5 show a circuit diagram and a sectional view of the infrared detector Px(i,j), respectively.

As shown in FIG. 4, a bolometer 12 and an infrared absorption layer 13 are disposed on a diaphragm 6. The bolometer 12 and the infrared absorption layer 13 are connected at their ends to each other via a contact 14 connected to a ground 15.

The bolometer 12 is connected at another end thereof through a lead resistance 16 to a bias source 17, to receive therefrom a bias voltage $V_0$, and directly to a scan circuit 20. An infrared reflection layer 18 is applied with a voltage Va from a variable voltage source 19, for changing a distance d between the infrared absorption layer 13 and an infrared reflection layer 18 or a cavity gap d'. A temperature increase of the diaphragm 6 causes a resistance variation of the bolometer 12, which variation is output by the a scan circuit 20.

As shown in FIG. 5, then scan circuit 20 is formed on a semiconductor substrate 21 and the infrared reflection layer 18 is formed thereabove. Above the infrared reflection layer 18, there is formed a cavity 5 and the diaphragm 6. The bolometer 12 and the infrared absorption layer 13 are disposed in the diaphragm 6.

The detector is applied with a variable voltage Va for varying the distance d or the gap d'. By increasing the applied voltage Va, d'=0 is established, that is, the diaphragm and the substrate effectively come in contact. Consequently, heat of the diaphragm is dissipated through the substrate, and a temperature is kept from rising. Therefore, even without a chopper which cuts off incident infrared rays, the condition is held as if the rays are cut off, and by having the signal level at this point as a reference level, drifts in the infrared detector and the circuit are effectively removed.

Figure 6A:
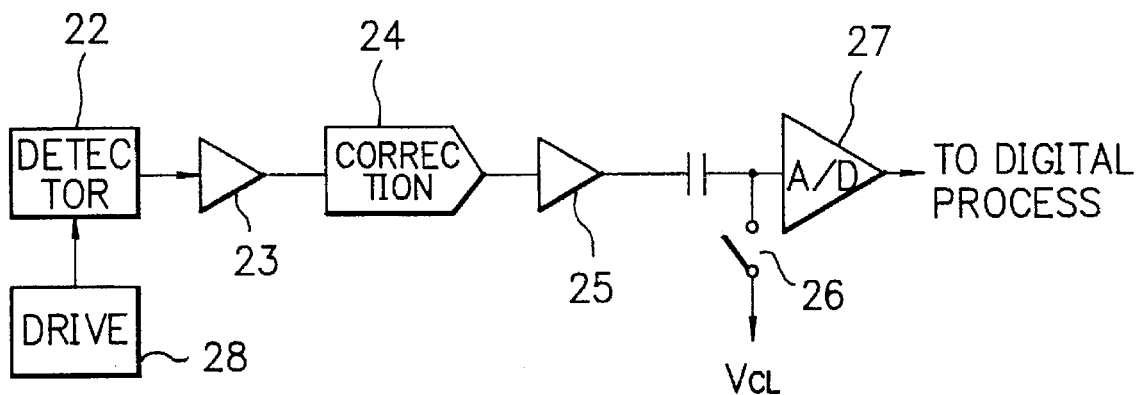
FIGS. 6A and 6B show a block diagram and a timing chart of an infrared detector according to another embodiment of the invention, respectively.
Figure 6B:
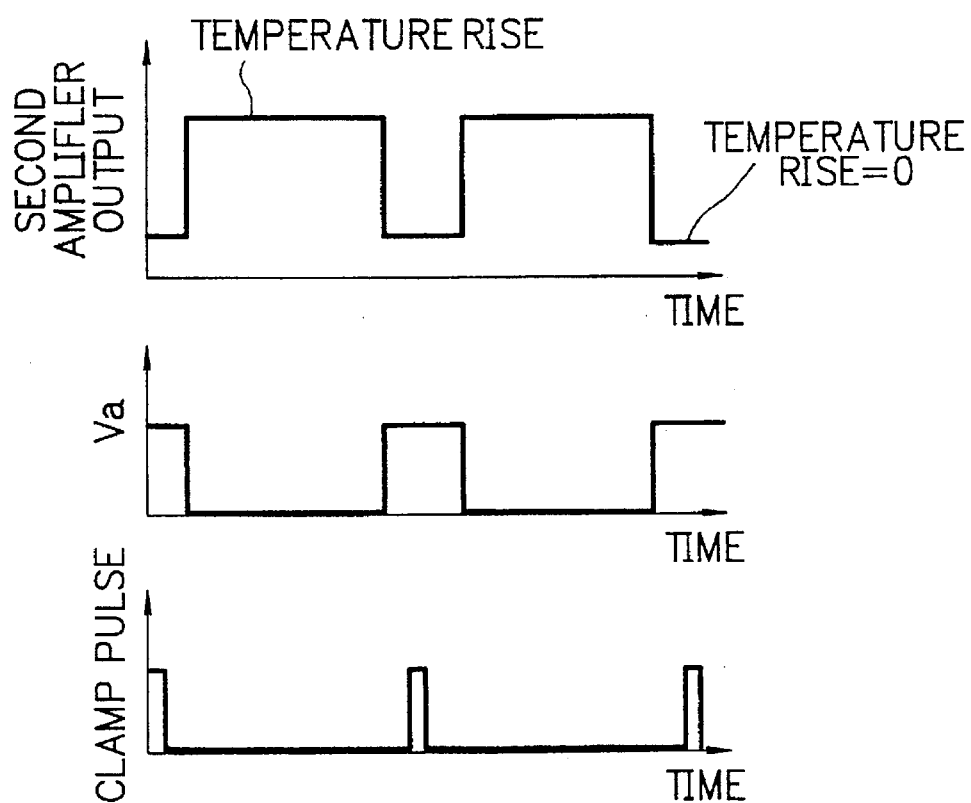

FIGS. 6A and 6B are a block diagram and a timing chart according to an embodiment of the present invention, respectively.

FIGS. 6A and 6B show a block diagram and a timing chart when d=0, that is, when a diaphragm and a substrate are in contact by increasing a variable voltage Va to vary the distance d or cavity gap d'.

In the block diagram of FIG. 6A, there is shown a driving circuit 28, an infrared detector 22, a first amplifier 23, a fixed-pattern-noise (FPN) calibrator 24, a second amplifier 25, a clamp circuit 26, and an A/D converter 27.

In FIG. 6B, there is shown three timing charts for an output of the second amplifier, Va, and a clamp pulse. Va is a voltage for varying a distance d or cavity gap d'.

The variable voltage Va is set to a level for the diaphragm and the substrate to come in contact, and applied as a pulse. When the pulse is applied, that is, when the diaphragm is in contact with the substrate and the temperature rise is 0, a signal line is clamped. By this, a signal is observed relative to a reference state with no infrared rays incident, and consequently, the effect of a drift is removed.

The circuit shown in FIGS. 6A and 6B is an embodiment having a reference state when a temperature rise is a 0, and may well be otherwise modified in a various manner such as by use of a digital circuit.

Further, as a method for dissipating heat of a diaphragm, besides contacting the diaphragm with a substrate, various methods may be implemented such as, for example, forming a structure which dissipate thermal energy upward in FIG. 5 and contacting therewith.

Furthermore, although a Coulomb force has been described as a contacting force, the present invention is not to be limited by this. Other methods such as using a magnetic force, an electromagnetic force, and thermal expansion are also possible.

Figure 7:
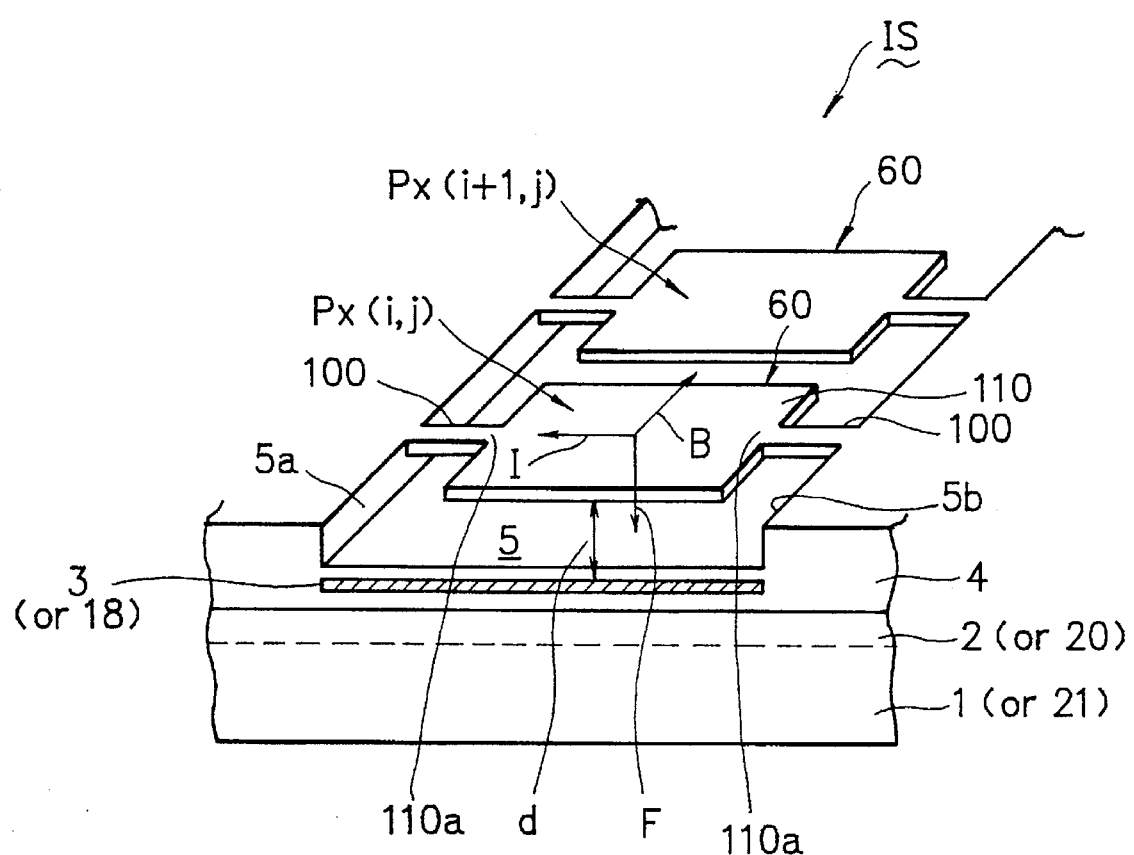
FIG. 7 shows a modification of the embodiments of the invention.

For example, in the case of an electromagnetic force, the foregoing embodiments may preferably be modified as shown in FIG. 7, in which like members to the embodiments described are designated by like reference characters.

In FIG. 7, designated at reference character 60 is a a diaphragm extending over a cavity 5. The diaphragm 60 has a floating structure composed of a substantially square light-receiving flat part 110 resiliently supported by left and right short legs 100, which legs 100 each extend from a central part 110a of a left or right edge of the light-receiving part 110 to a left or right side wall 5a or 5b of the cavity 5, where it joins an oxide film 4. The light-receiving part 110 includes therein an unshown infrared reflection layer, which is identical to the layer 18 in the embodiments described. The left leg 100 as well as the right leg 100 may be doubled, tripled or further multiply in number.

In this modification, a current I is conducted from the right side wall 5b via the right leg 100, the light-receiving part 110 where the current I is uniformly ditributed, and the left leg 100 to the left side wall 5a.

Moreover, a uniformly distributed magnetic flux B is developed in a direction of an array of pixels Px(i,j), at right angles to the current I.

Accordingly, by the Flemming's Law, a downward force F is generated, exerting on the light-receiving part 110 so that a distance between an infrared reflection layer 3 and the infrared absorption layer in the light-receiving part 110 is controllable.

As described, according to the present invention, a wavelength of an infrared ray absorbed is effectively varied, which enables an optimum absorption for each wavelength of an incident infrared ray. Therefore, a sensitivity is prevented from deteriorating despite of a variation of an incident infrared ray.

Further, a drift is effectively removed without using a chopper, and thus a size reduction and a low power consumption are permitted.

Figure 8:
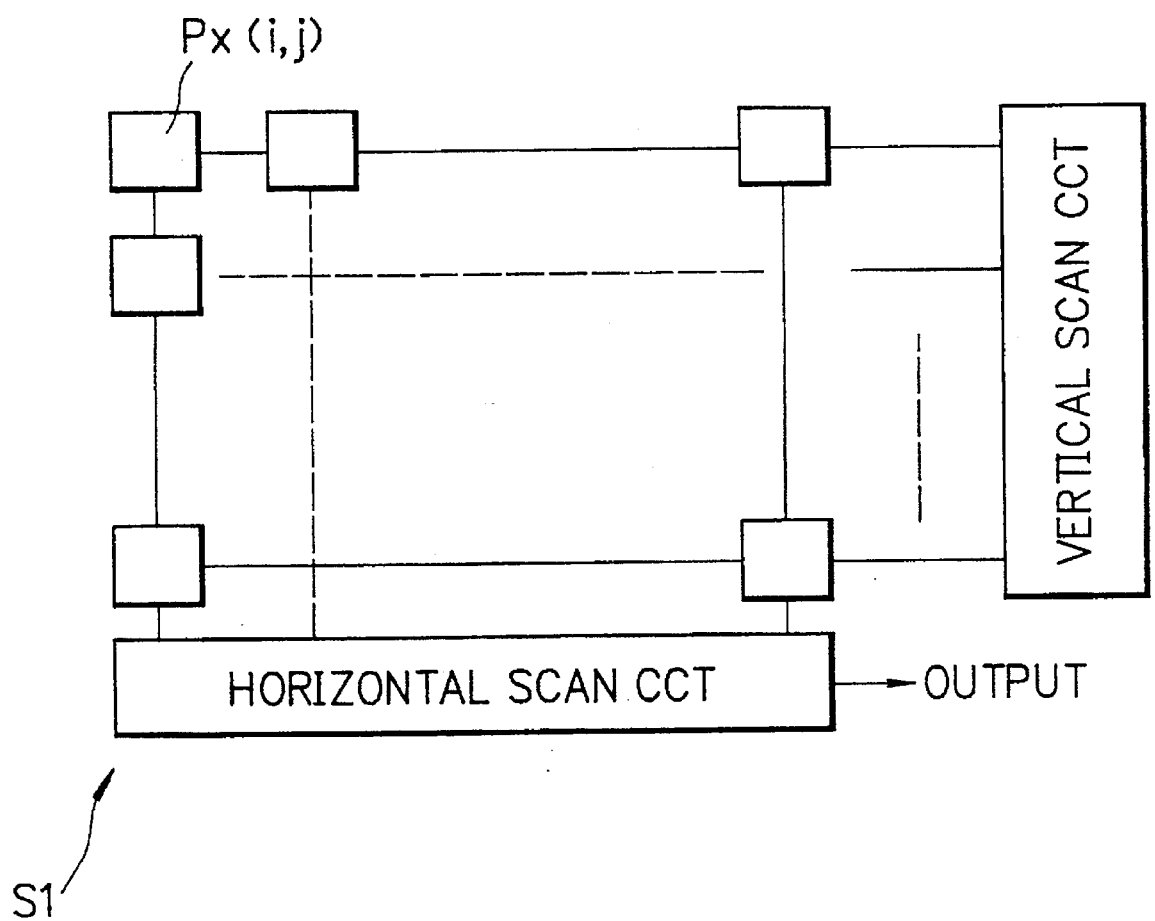
FIG. 8 is a block diagram of an infrared image sensor including a matrix of pixel elements as infrared detectors according to the invention.

FIG. 8 shows an infrared image sensor IS in which an infrared detector Px(i,j) according to any of the foregoing embodiments can be employed.

The image sensor IS comprises a matrix of infrared detectors Px(i,j), a scan circuit for sequentially scanning the infrared detectors Px(i,j) to read out an electric signal from a bolometer or the like of each infrared detectors Px(i,j) in a known manner.

While the present invention has been described in its preferred embodiments with reference to the accompanying drawings, it will be appreciated that various changes and modifications can be made by those skilled in the art without departing from the spirit and scope of the present invention.

What is claimed is:

1. An infrared detector including an infrared reflection layer and a diaphragm member facing each other, with a space intervening therebetween, the diaphragm member having an infrared absorbable layer, wherein:

the diaphragm member includes means for varying a distance of said diaphragm member relative to the infrared reflection layer in dependence on a wavelength of an incident infrared ray.

2. The infrared detector according to claim 1, having at a side thereof, where the infrared reflection layer is provided, a semiconductor substrate and a scan circuit in the semiconductor substrate.

3. The infrared detector according to claim 1, wherein the diaphragm member comprises a bimetal structure composed of a pair of layers different of an internal stress characteristic from each other.

4. The infrared detector according to claim 1, wherein the infrared reflection layer comprises a tungsten silicide.

5. The infrared detector according to claim 1, wherein the varying means comprise a voltage applied between a first conductive layer disposed on a side of the infrared detector, where the infrared reflection layer is provided, and a second conductive layer disposed on another side thereof, where the diaphragm is provided.

6. A method for controlling an infrared detector including an infrared reflection layer and a diaphragm member facing each other, with a space intervening therebetween, the diaphragm member having an infrared absorbable layer, comprising varying the distance between the diaphragm member and the infrared reflection layer in dependence on a wavelength of an incident infrared ray.

7. A method according to claim 6, wherein the distance between the diaphragm member and the infrared reflection layer is varied by varying a voltage applied between a first conductive layer disposed at a side of the infrared detector, where a structure of the infrared reflection layer is provided, and a second conductive layer disposed at another side thereof, where the diaphragm is provided.

8. A method for controlling an infrared detector including an infrared reflection layer and a diaphragm member facing each other, with a space intervening therebetween, the diaphragm member having an infrared absorbable layer, comprising temporarily bringing a surface of the diaphragm member into contact with a surface of a structure of the infrared reflection layer during operation of said detector, thereby to dissipate heat accumulated within said diaphragm member.

9. A method according to claim 8, wherein the distance between the diaphragm member and the infrared reflection layer is varied by varying a voltage applied between a first conductive layer disposed at a side of the infrared detector, where the structure of the infrared reflection layer is provided, and a second conductive layer disposed at another side thereof, where the diaphragm is provided.

10. A method for controlling an infrared detector including an infrared reflection layer and a diaphragm member facing each other, with a space intervening therebetween, the diaphragm member having an infrared absorbable layer, comprising varying the distance between the diaphragm member and the infrared reflection layer in dependence on a wavelength of an incident infrared ray, wherein a surface of the diaphragm member and a surface of a structure of the infrared reflection layer are temporarily brought into contact with each other.

11. A method according to claim 10, wherein the distance between the diaphragm member and the infrared reflection layer is varied by varying a voltage applied between a first conductive layer disposed at a side of the infrared detector, where the structure of the infrared reflection layer is provided, and a second conductive layer disposed at another side thereof, where the diaphragm is provided.

* * * * *